US009811822B2

(12) United States Patent
Raboisson et al.

(10) Patent No.: US 9,811,822 B2
(45) Date of Patent: Nov. 7, 2017

(54) METHOD AND DEVICE FOR EXECUTION CONTROL FOR PROTECTED INTERNAL FUNCTIONS AND APPLICATIONS EMBEDDED IN MICROCIRCUIT CARDS FOR MOBILE TERMINALS

(75) Inventors: Aurelien Raboisson, Bagneux (FR); Sylvestre Denis, Houilles (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 1249 days.

(21) Appl. No.: 13/315,368

(22) Filed: Dec. 9, 2011

(65) Prior Publication Data
US 2012/0149327 A1    Jun. 14, 2012

(30) Foreign Application Priority Data
Dec. 9, 2010 (FR) ...................................... 10 60288

(51) Int. Cl.
*H04W 12/06* (2009.01)
*G06Q 20/32* (2012.01)
*G07F 7/10* (2006.01)

(52) U.S. Cl.
CPC ..... *G06Q 20/3278* (2013.01); *G06Q 20/3229* (2013.01); *G07F 7/1008* (2013.01)

(58) Field of Classification Search
CPC ........... H04W 52/028; H04W 52/0229; H04W 52/0225; H04W 52/02; H04W 88/02; H04W 8/183; H04W 12/06; Y02B 60/50; H04B 1/1615; H04B 1/3816
USPC ... 455/410, 411, 574, 41.2, 550.1, 557, 558; 340/7.32, 7.36, 7.37; 713/300, 310, 320, 713/321, 322, 323
See application file for complete search history.

(56) References Cited

U.S. PATENT DOCUMENTS

| 2002/0085008 A1* | 7/2002 | Jain ........................ G06T 17/00 345/520 |
| 2002/0120852 A1* | 8/2002 | Krishnan et al. ............. 713/185 |
| 2003/0174760 A1* | 9/2003 | Rick et al. ..................... 375/147 |
| 2004/0235450 A1* | 11/2004 | Rosenberg .................... 455/406 |
| 2007/0101152 A1* | 5/2007 | Mercredi et al. ............. 713/185 |
| 2008/0197889 A1* | 8/2008 | Oki et al. ........................ 327/74 |

FOREIGN PATENT DOCUMENTS

| EP | 0 700 023 | 3/1996 |
| EP | 0 926 638 | 6/1999 |
| WO | 2009141764 | 11/2009 |

OTHER PUBLICATIONS

French Search Report dated Aug. 4, 2011, corresponding to Foreign Priority Application No. 1060288.

\* cited by examiner

*Primary Examiner* — Christopher M Brandt
(74) *Attorney, Agent, or Firm* — Young & Thompson

(57) ABSTRACT

The invention in particular relates to the execution control of protected internal functions and applications embedded in a mobile terminal microcircuit card. The control of a protected internal function is directly carried out in the microcircuit card. After having detected (400) a command for placing the card on standby, on the basis of an item of information received from a mobile terminal into which is connected the card, at least one indication relative to the execution of the protected internal function is analyzed (415). If the protected internal function is liable to be affected by the execution of the command for placing on standby, the execution of the command for placing on standby is deferred (410).

20 Claims, 4 Drawing Sheets

METHOD AND DEVICE FOR EXECUTION CONTROL FOR PROTECTED INTERNAL FUNCTIONS AND APPLICATIONS EMBEDDED IN MICROCIRCUIT CARDS FOR MOBILE TERMINALS

BACKGROUND OF THE INVENTION

Field of the Invention

The present invention concerns the execution of functions in microcircuit cards and more particularly a method and a device for execution control for protected internal functions and embedded in microcircuit cards for mobile terminals, in particular identification cards.

Description of the Related Art

The development of mobile terminals such as mobile telephones has led to the development of numerous applications which are not necessarily, of themselves, telephone applications. Among these applications there are in particular game applications, applications for personal information management, for time management, electronic purse applications, payment applications etc. A payment or electronic purse application enables a product or service to be paid for via one's mobile telephone.

Depending on their nature, the access to these applications or to certain of their functionalities may be controlled. Thus, for example, payment applications, in particular for the payment of substantial sums, generally require an identification of the user. Such an identification may be carried out on the basis of an identification card if the mobile terminal used for executing the application has one.

There are in particular identification cards in existence known under the names of SIM cards (SIM being the acronym for Subscriber Identity Module), USIM cards (USIM being the acronym for Universal Subscriber Identity Module), UICC cards (UICC being the acronym for UMTS Integrated Circuit Card, UMTS standing for Universal Mobile Telecommunications System) and RUIM cards (RUIM being the acronym for Removable Universal Identity Module).

These cards generally comprise means for processing data and data storage means for the storage of information specific to a user of a mobile telephone network. The presence of such a card within a mobile terminal, in particular a mobile telephone, enables that terminal, by virtue of the information contained in the identification card, to connect to the network and exchange data with other terminals of the network, in particular in a secure manner (the card contains for example a cryptographic key enabling authentication of a user with the network and encryption of data exchanges).

The identification cards form a secure element of the mobile terminals enabling authentication of the users of those cards by virtue of authentication keys stored in memory, for example in storage means of those cards.

Moreover, some mobile terminals have short-range wireless communication means, for example of NFC type (NFC standing for Near Field Communication). The mobile terminals then comprise a near field communication antenna. This antenna may also be integrated into a card that is removable from the terminal. It enables the exchange of data between the mobile terminal and an external item of equipment such as a payment station.

It is thus possible, using a mobile terminal, to make a payment by contactless communication. Such communication is, for example, in accordance with the standard ISO 14443 which is directed to an identification card format and to an associated communication protocol.

To use this type of service or to exchange information, the user brings his mobile terminal close to the station, such that a transaction by near field communication can be carried out.

Furthermore, a selection of bank applications may be activated in the identification card of the mobile terminal used, for example by the microcontroller of a SIM card. The activation of this selection of applications is for example commanded by the mobile terminal in accordance with the ISO 7816 standard relative to identification cards with contacts. The user may then choose one of the selected bank applications.

As indicated earlier and in order to make secure an operation carried out by the chosen application, an authentication of the user may be carried out. This may in particular consist of requesting a password from the user, for example his or her PIN code (PIN being the acronym for Personal Identification Number) via a graphical interface of the mobile terminal. The PIN code used here is generally different from the PIN code used to access the telephone functions. After the user has entered it, for example using a keyboard, whether real or virtual (for example using a touch screen), that password is sent to the identification card, for example according to the ISO 7816 standard, which compares it to a code stored in a non-volatile memory of the identification card. If that password and that code match, the operation is authorized, in the opposite case, it is rejected.

For reasons of security, the password entered by the user is generally of limited duration. Thus, if the operation concerned has not been performed within the set time, the code expires. Such a time is generally predetermined, its value is typically one minute. If the time has expired and the user nevertheless wishes to carry out the operation concerned, he must reenter the password.

Although such a system enables the risks of fraud to be limited, there is nevertheless a constant need to improve the security linked to the execution of certain operations carried out from a mobile terminal, in particular transactions.

BRIEF SUMMARY OF THE INVENTION

The invention enables at least one of the problems set forth above to be solved.

The invention thus relates to a method for execution control of at least one protected internal function embedded in a microcircuit device adapted to be used in cooperation with a mobile terminal, this method, implemented in said microcircuit device, comprising the following steps, detecting a command for placing said microcircuit device on standby, said command for placing on standby being detected on the basis of an item of information received from a mobile terminal into which is connected said microcircuit device;

analyzing at least one indication relative to the execution of said at least one protected internal function; and, if said at least one protected internal function is liable to be affected by the execution of said command for placing on standby, deferring execution of said command for placing on standby.

The method according to the invention thus makes it possible to protect the integrity of a microcircuit device such as a microcircuit card and to ensure the protection of protected applications executed by that device by deferring, if necessary, the execution of commands for placing the device on standby. For these purposes, a command for placing on standby is deferred as a function of the execution of protected internal functions, for example countdown functions which may be used to determine the validity of a password or memory management functions of the microcircuit device.

According to a particular embodiment, the method further comprises the following steps,
  setting a state variable to a first value on launching said at least one protected internal function; and,
  setting said state variable to a second value when the execution of said at least one protected internal function has terminated or when said protected internal function is reinitialized; said analyzing step comprising a step of analyzing the value of said state variable.

According to this embodiment, a state variable is used as a means for exchanging information between protected internal functions and a module for managing placing on standby of the device, this module being capable, depending on the value of that variable, that is to say depending on the execution of protected internal functions, of deferring or not deferring the execution of a command for placing on standby.

According to another embodiment, the execution of said command for placing on standby is directly controlled by said at least one protected internal function. It is then not necessary to use any state variable for these purposes.

Advantageously, the method further comprises a step of comparing a level of standby requested associated with said command for placing on standby with a standby state of said microcircuit device. Thus, according to the relative values of the requested and real levels of standby, it may be determined whether or not it is necessary to verify whether the execution of a command for placing on standby must be deferred or not.

Still according to a particular embodiment, said microcircuit device or said mobile terminal being provided with short-range wireless communication means and said microcircuit device comprising an embedded protected application making use of said short-range wireless communication means and of said protected internal function, the method further comprises the following steps,
  receiving an item of authentication data for the execution of said protected application, said item of authentication data being received from said mobile terminal;
  comparing said received item of authentication data with at least one item of data stored in said microcircuit device;
  if said received item of authentication data corresponds to said at least one stored item of data and if said protected application is invoked, verifying the validity of said received item of authentication data according to at least one criterion dynamically defined in said microcircuit device; and
  if said received item of authentication data is valid, executing said protected application.

The method according to the invention thus makes it possible to determine the validity of a password entered by a user, without recourse to means of the mobile terminal in which the microcircuit device is used. The method according to the invention thus enables the security linked to the use of a password to be improved.

Advantageously, said protected internal function is a countdown function, the method further comprising, if said received item of authentication data corresponds to said at least one stored item of data, a step of invoking said countdown function for a predetermined time, said verifying step comprising verifying that said time has not run out. The validity of a password is thus limited in time, the time countdown being made in secure manner in the microcircuit device. Said countdown function is preferably based on a hardware clock of said microcircuit device.

Still according to a particular embodiment, the method further comprises the following steps,
  receiving at least one item of information from said mobile terminal to which said microcircuit device is connected, to indicate that at least one contactless access station is accessible via said short-range wireless communication means;
  selecting at least said protected application embedded in said microcircuit device in response to said at least one received item of information and sending at least one reference to said at least one selected application to said mobile terminal; and,
  receiving at least one identifier of an application, said identifier corresponding to a reference to said embedded protected application.

The method thus enables the simple and secure implementation of applications such as payment applications.

The present invention also relates to a computer program comprising instructions adapted for the implementation of each of the steps of the method described earlier when said program is executed on a computer.

The invention also relates to a device comprising means such as a microcontroller adapted to the implementation of each of the steps of the method described earlier as well as an identification card of a subscriber to a mobile telephone network comprising such a device and a mobile terminal integrating such a device.

According to a particular embodiment, the device further comprises at least one memory configured to store at least one item of data relative to said at least one protected internal function. Still according to a particular embodiment, the microcontroller is furthermore configured for executing a cryptography algorithm protecting said at least one item of data relative to said at least one protected internal function and/or for executing an algorithm for hardware protection of at least one component of said device in order to improve the protection of said at least one internal function.

The advantages procured by this computer program, this device and this identification card are similar to those referred to above.

BRIEF DESCRIPTION OF THE DRAWINGS

Other advantages, objects and features of the present invention will emerge from the following detailed description, given by way of non-limiting example, relative to the accompanying drawings in which.

DETAILED DESCRIPTION OF THE PREFERRED EMBODIMENTS

Figure 1:
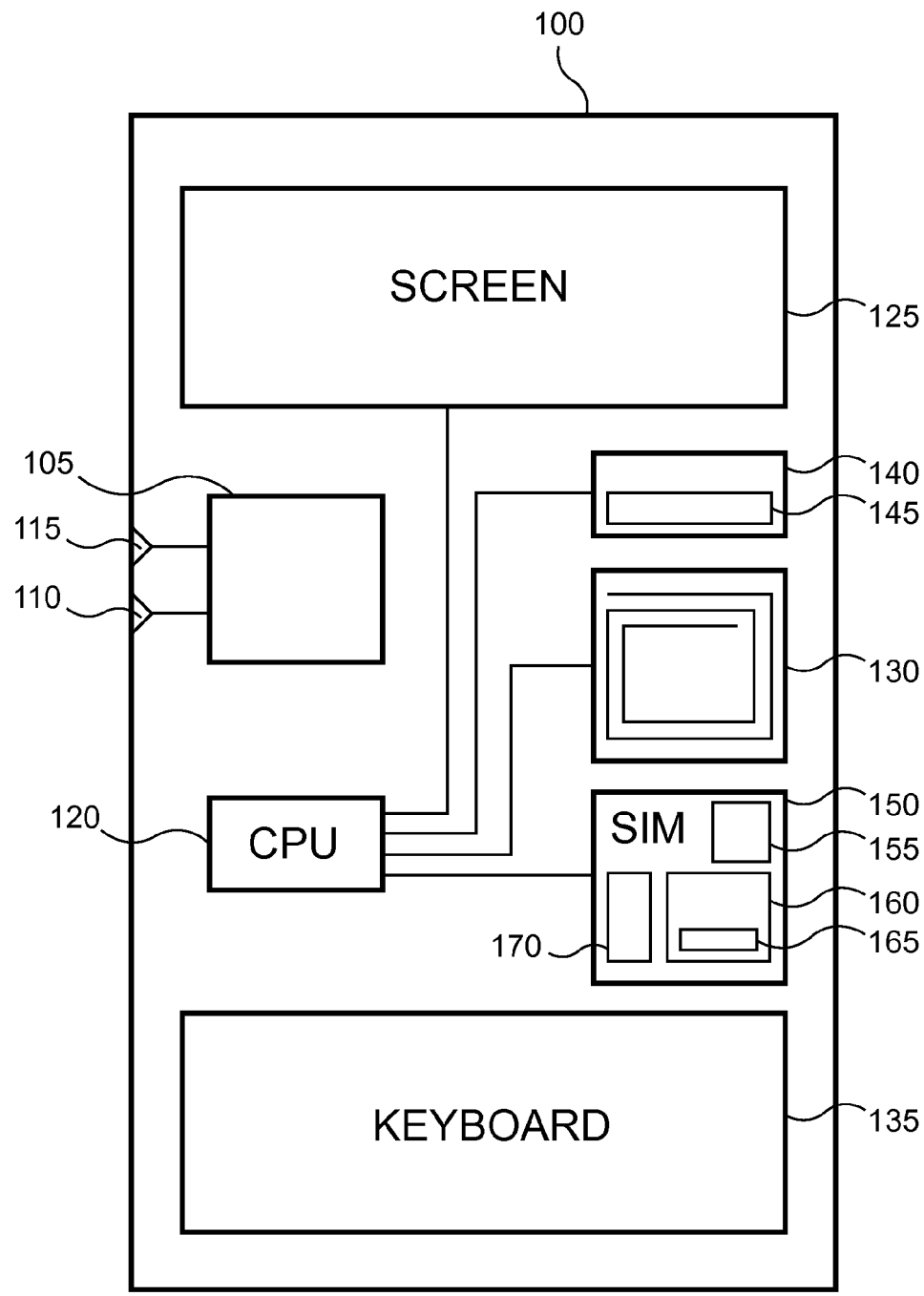
FIG. 1 is a diagram of a mobile terminal and an associated microcircuit card enabling the implementation of the invention.

It has been observed that the security linked to the execution of certain operations performed by a mobile terminal in conjunction with a microcircuit card has weaknesses in that part of the security mechanism is implemented in the mobile terminal and the latter cannot be considered as a secure execution zone.

In particular, it has been observed that due to the specifications of the mobile and bank operators, the mobile terminals implement intermediary applications. These applications are in particular used for computing the expiry time for a password entered by a user. They may be implemented in midlet form, that is to say a set of Java APIs (API standing for Application Program Interface) defining the manner in which the applications executed in a card inserted into a mobile terminal connect to the terminal interface. Similarly, a password may be valid for a given number of uses.

In other words, the security of protected applications to be executed via a mobile terminal is not all that good. By way of illustration, the invalidation command for a password at the end of an expiry time is a function implemented on a mobile terminal and thus the result is typically sent in non-secure manner to a microcircuit card, for example a SIM card. The midlets implementing these functions are not certified, in particular by the bank authorities. These functions may thus be the target of fraudulent attacks and their results may be intercepted.

Furthermore, midlets may be defective, which may lead to a password being valid over a long period. Thus, for example, when a user must enter a password to perform transactions greater than a given sum, that user may perform transactions greater than that sum without realizing if the password expiry mechanism is defective.

Furthermore, it is observed that microcircuit cards generally have a mode, referred to as standby mode, enabling functions of those cards to be partially or totally inhibited. Such a mode is directed to reducing the electricity consumption of the microcircuit card in order to save the battery charge of the mobile terminal in which the microcircuit card is used (a microcircuit card typically being electrically supplied by the mobile terminal to which it is connected). Thus, in other words, there is an active state in which a microcircuit card may be used "normally", one or more standby states in which only certain functions of the card may be used and a stopped state in which no function may be used. To pass into an active or standby state from the stopped state, it is generally necessary to start the card, which generally takes non-negligible time. The state of a microcircuit card is, according to the current standards, controlled by the mobile terminal in which the card is used. Thus, for example, according to the ISO 7816 standard, the function of a mobile terminal for placing a microcircuit card on standby, more particularly for stopping its internal clock, is "clockstop", the effect of which is to stop the clock signal sent by the mobile terminal to the microcircuit card. When the microcircuit card detects the stoppage of the clock signal, it goes into standby.

The invention concerns the implementation of protected internal functions, in particular security functions, for example functions for computing an expiry time of a password or, more generally, of an item of authentication data entered by a user, in a microcircuit card, for example a SIM, UICC, UMTS or RUIM card, configured to be used in cooperation with a mobile terminal. Thus, in accordance with the invention, the validation of an item of authentication data of a user is carried out according to a criterion dynamically defined in the identification card. This criterion is typically a time of validity and/or a number of uses. The invention also concerns the implementation of other protected functions such as memory management functions.

FIG. 1 represents a mobile terminal 100 adapted for implementing the invention. As illustrated, the mobile terminal 100 comprises a mobile telephone module 105 advantageously linked to a loudspeaker 110 and to a microphone 115. The mobile telephone module is connected to an antenna (not shown) of the mobile terminal 100 to communicate with the mobile telephone network. The mobile terminal 100 also comprises a central processing unit 120, also called CPU, and, preferably, a screen 125.

The mobile terminal 100 further comprises a module 130 for short-range communication, advantageously a short-range wireless communication module. The module 130 is for example of NFC type. The module 130 may be implanted directly in the mobile terminal 100, for example in integrated circuit and antenna form, or be inserted into the mobile terminal 100, for example in the form of a microcircuit card comprising an integrated antenna.

The mobile terminal also comprises an input device 135, such as a keyboard or equivalent device, for inputting characters, values and/or commands. The input device 135 forms, in cooperation with the screen 125, a user interface. The input device 135 may also be integrated into the screen 125 in the form of a touch screen.

The mobile terminal 100 also comprises a memory module 140 adapted to store at least applications and/or software interfaces 145 used between the mobile terminal 100 and some of those components, which are fixed or removable, such as the module 130 and a microcircuit card connected to that mobile terminal, for example the identification card 150.

Here, the identification card 150 is a SIM card provided with a microcontroller 155, a first memory 160 and a second memory 170. The first memory 160 is used here to store applications such as applications of the user, of the user's operator and bank applications. Part 165 of that memory is furthermore used to store information, parameters and/or user information to enable the user to access a mobile telephone network, in particular a PIN type code. The first memory 160 is typically a flash type memory. The second memory 170 is a ROM type memory here (ROM being an acronym for Read Only Memory). It is in particular used for storing the operating system of the identification card as well as interface functions.

According to a particular embodiment, the short-range communication module 130 may be partially or fully integrated into the identification card 150.

The identification card 150 is preferably removable and secure.

The invention concerns a mechanism implemented directly in a microcircuit card, that is to say, in general terms, a microcircuit device, for example in a SIM card 150, to control the execution of protected internal functions, in relation to the state of the card, in particular internal functions invoked by protected applications. The microcircuit device, comprising for example the microcontroller 155 and the memories 160 and 170, may be integrated into the mobile terminal.

According to a particular embodiment, the invention concerns a mechanism for dynamically managing the validity of a password entered by a user using input means such as the keyboard 135. This mechanism may in particular consist in verifying the duration of validity of the password and/or in testing the number of executions of an application protected using the same entered password. Such a mechanism that is internal to the microcircuit card is less sensitive to attacks than a similar mechanism implemented in a mobile terminal since the environment of a microcircuit card is generally more secure than the environment of the mobile terminal. Furthermore, such a mechanism may easily be certified, for example by a bank authority.

Advantageously, this mechanism uses an internal function of the microcircuit card, generally called timer. A timer is typically defined as a hardware or software function given the task of managing an interrupt after a number of clock pulses to activate or execute another function, typically of software code. This number of clock pulses and the clock to be used (for example the clock of the microcircuit card) are generally supplied to the function as parameters.

In accordance with the invention an interface (API) is, for example, added to the operating system used within the microcircuit card to provide internal functions for verifying validity of a password received from the mobile terminal to which the card is connected. These functions enable in particular a predefined validity time of a password to be counted down. The interface added here consists for example of a service supplied by the operating system of the SIM card to a bank application, for example an application of cardlet type. Such a service is for example invoked as soon as a received password is considered as correct, that is to say when it matches an item of authentication data stored beforehand in memory.

To verify a predefined time of validity of a password, the hardware clock of the microcircuit card is, preferably, used. The timer function using such a clock, also called hardware timer, may be considered as a hardware extension of the operating system of the microcircuit card, the operating system generally being software. This hardware timer function, which generally exists within SIM cards, more particularly within the microcontroller, gives the advantage of commonly being certified, by the manufacturers, according to the common criteria known under the EAL4+ standard.

As a variant, a timer software function known as software timer may be used. The clock used for these purposes may be generated from the hardware clock of the microcircuit card or from a clock of the mobile terminal. A software timer is not generally certified by the manufacturers.

According to a preferred embodiment, the microcircuit card comprises at least two levels of standby. A first level corresponds to a full standby in which all of its components are on standby (this is thus a standard standby mode). A second level corresponds to a partial standby in which certain functions are active. Thus, for example, the countdown function for a predefined time of validity of a password may remain active at this standby level. In other words, in the partial standby mode, the timer function (software timer or hardware timer) is active here.

Figure 2:
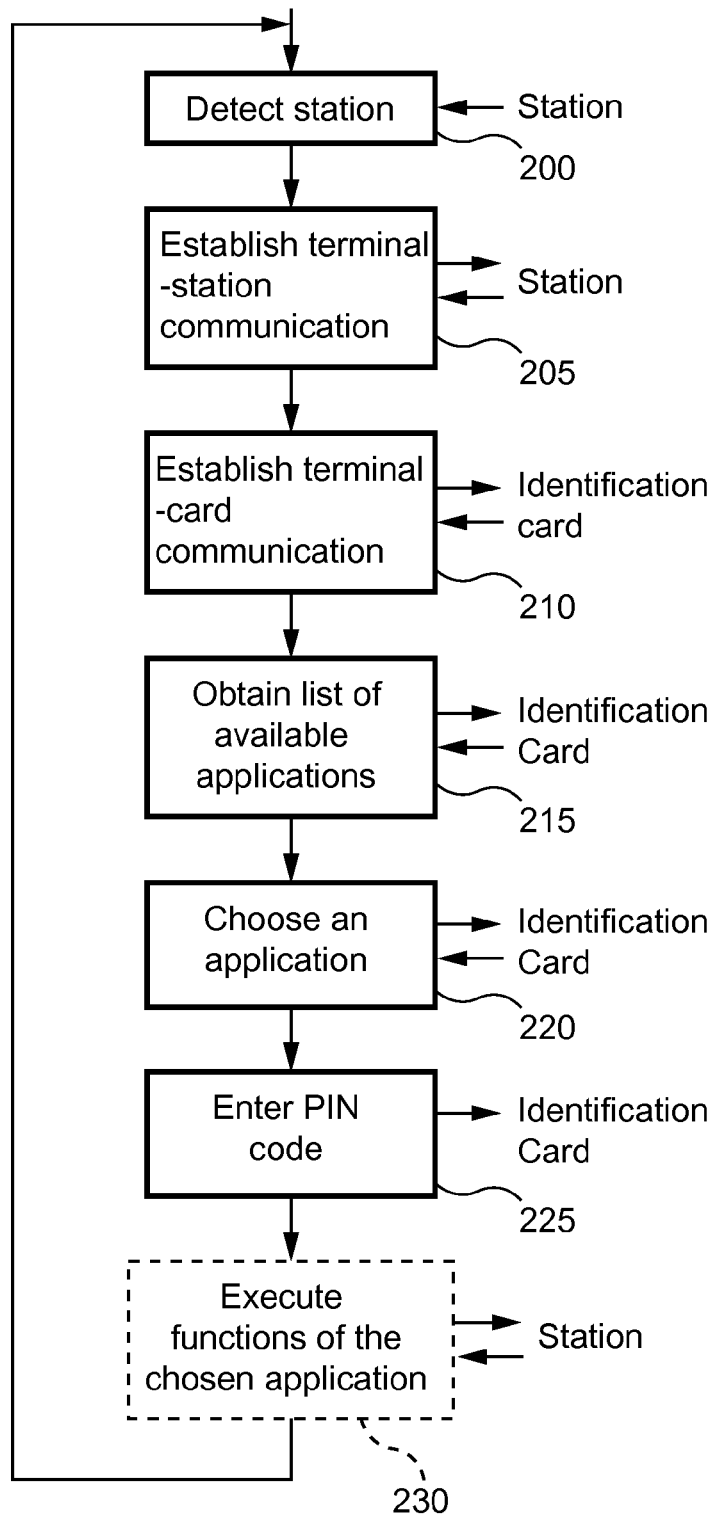
FIG. 2 illustrates certain steps implemented in a mobile terminal in accordance with the invention.

FIG. 2 illustrates certain steps implemented in a mobile terminal in accordance with the invention.

A first step (step 200) is directed to detecting a station, for example a payment station for paying for an object or a service, such as the access to a museum. According to the configuration of the short-range wireless communication module used, this step may be carried out automatically by detection of a signal or in response to a command from the user made via an interface of the mobile terminal used.

In a following step (step 205), a communication channel is set up between the mobile terminal and the station detected previously. This communication channel is set up here according to a standard protocol, for example a protocol in accordance with the ISO 14 443 standard. In parallel, simultaneously or previously, a communication channel is set up between the mobile terminal used and a microcircuit card contained therein (step 210). Again, this communication channel is preferably set up according to a standard protocol, for example a protocol in accordance with the ISO 7816 standard.

Next, an item of information relative to the detected station is sent to the microcircuit card to enable it to select applications contained in that card and which may be executed. The selection of applications is, preferably, based on the type of station detected. A reference to these selected applications is sent to the mobile terminal, for example in list form (step 215). They are, for example, bank applications.

The list of the selected applications may be displayed on the mobile terminal in order to enable the user to choose one of them (step 220). A reference of the chosen application is then sent to the microcircuit card which, if applicable, indicates to the mobile terminal that a password must be entered by the user. In this case, the user enters a password using, for example, a keyboard or a similar device linked to the mobile terminal (step 225). This password is then sent to the microcircuit card, for example according to the ISO 7816 standard, which verifies it and launches the execution of the chosen application, that is to say functions of that application. These functions may be identified by the chosen application itself or be selected by the user. It may in particular be an order for payment the amount of which may be input by the user or sent by the station on setting up the communication between the mobile terminal and the station.

On execution of these functions (step 230), the mobile terminal is generally used as interface between the microcircuit card and the short-range wireless communication module of the mobile terminal.

As illustrated, the method may be repeated until it is made to terminate (automatically or by the user).

Figure 3:
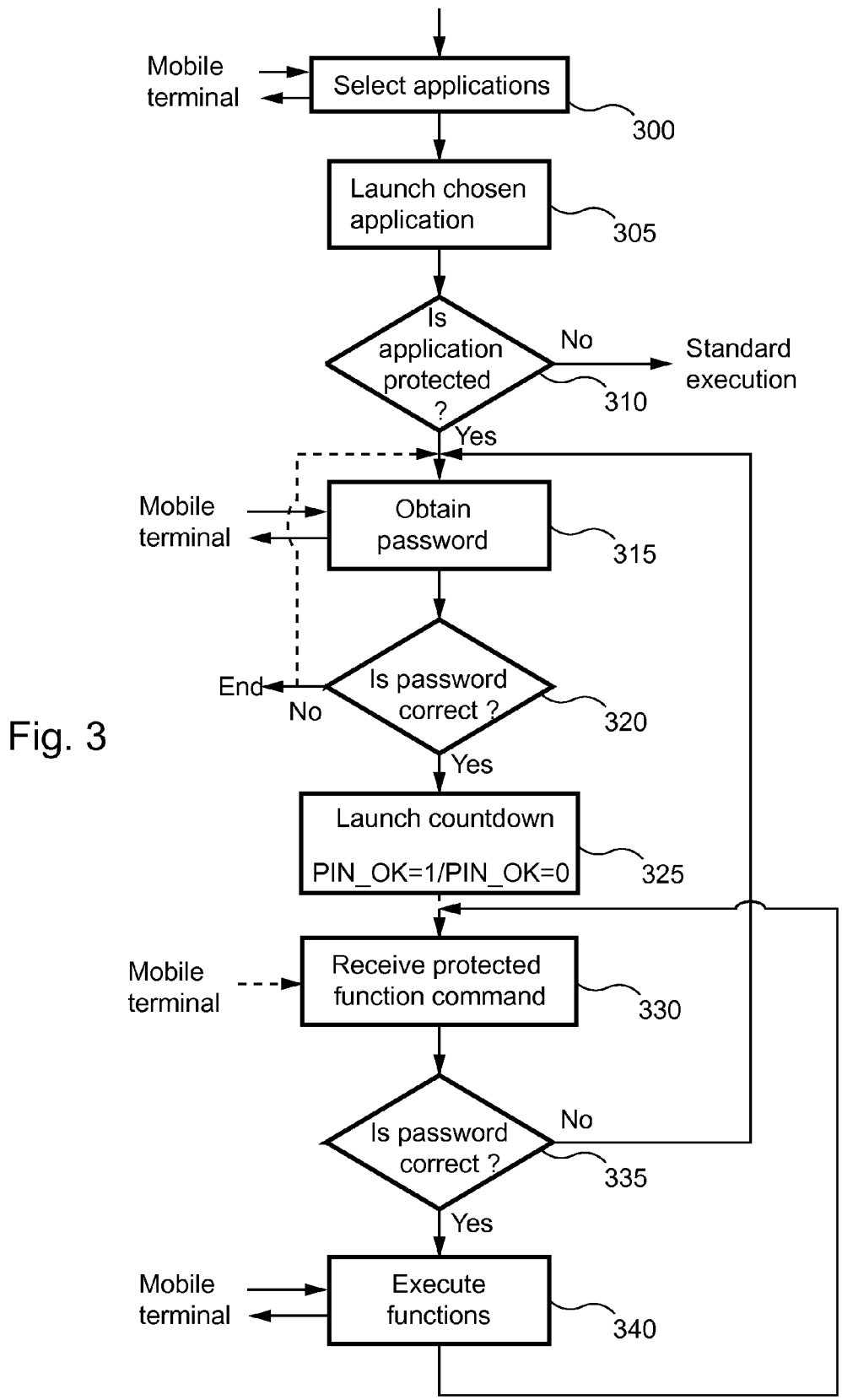
FIG. 3 illustrates certain steps implemented in a microcircuit card in accordance with the invention; and, FIG. 4 illustrates certain steps of an example algorithm of a module for managing placing on standby, in accordance with the invention.

FIG. 3 illustrates certain steps implemented in a microcircuit card, for example a SIM card, in accordance with the invention.

A first step (step 300) is directed here to the selection of applications contained in the identification card. As described earlier, such a selection is, preferably, made according to characteristics of a station with which the mobile terminal comprising the microcircuit card has set up a communication channel. Such characteristics may thus concern indications relative to the payment of a sum or to the recharging of an electronic purse or of communication credit.

References to the selected applications are then sent to the mobile terminal, for example in the form of a list. When such a list is received by the mobile terminal, it is preferably displayed such that the user can choose one of the applications. When an application has been chosen, a reference thereto is sent to the microcircuit card, more specifically to the microcontroller of the microcircuit card, to enable it to launch the corresponding application (step 305).

Alternatively, if only one application is able to be executed or depending on configuration parameters, an application may be directly launched without it having been explicitly chosen by the user.

On launching an application, a test is carried out to determine whether the application is protected, that is to say whether the execution of that application or of certain of its functions requires the authentication of the user (step 310). In the negative, the application is executed in a conventional manner by the microcontroller of the microcircuit card.

In the opposite case, if the application is protected, an instruction is sent here to the mobile terminal in order to obtain a password enabling the application to be unlocked by authentication. The password is, preferably, entered by the user, using a keyboard or similar device linked to the mobile terminal then sent to the microcircuit card.

It is noted here that data linked to the protected function or functions, which are stored in memories of the microcircuit card, for example the memory 160 and/or the memory 170, which are described with reference to FIG. 1, may be protected using cryptography algorithms conforming to the FIPS standard (FIPS being an acronym for Federal Information Processing Standards).

Similarly, components of the microcircuit card such as the microcontroller 155 and the memories 160 and 170 described with reference to FIG. 1, in which are stored data relative to the protected function or functions, may be provided with hardware protection against so-called non-invasive attacks (for example attacks by time analysis, consumption analysis, electromagnetic analysis and/or clock-based attacks), invasive attacks or semi-invasive attacks.

After having obtained a password (step 315), a test is carried out to determine whether the received password is correct (step 320). For these purposes, the microcontroller of the microcircuit card or a cryptography module linked to that microcontroller, compares the received password to an item of data stored in advance. Such a comparison may in particular be made using standard cryptography and authentication algorithms.

Alternatively, other modes of authentication such as the recognition of fingerprints may be used.

If the password is not correct, the process is made to terminate or an instruction is sent to the mobile terminal to invite the user to re-enter a password (as indicated by an arrow in dashed line).

On the contrary, if the password is correct, a time countdown function, that is to say a protected internal function, is activated (step 325). As described earlier, the object of this function is to identify a time within which the received password is considered as valid. The length of this time is, preferably, predetermined. The countdown function is based on a clock of the microcircuit card or, alternatively, on a clock of the mobile terminal.

Alternatively, the countdown function may be launched before verifying the password, the countdown function being stopped if the password is not correct.

The countdown function is typically based on the timer function (preferably the hardware timer function) described earlier. This function is invoked with, as parameters, the duration of validity of the password and the clock to be used. On expiry of the timer, that is to say at the end of execution of the timer function, an interrupt is generated. It indicates to the countdown function that the latter has terminated. The countdown function may also be assimilated to the timer function.

According to a particular embodiment, a first indication is sent to the operating system of the microcircuit card, or more generally to a module for managing placing on standby, when the countdown function is activated. Similarly, a second indication is sent to the operating system of the identification card, or more generally to a module for managing placing on standby, when the countdown function is reinitialized or the countdown has terminated. Thus, knowing the state of the countdown function, the operating system or more generally a module for managing placing on standby, may prohibit the full standby state of the identification card when the countdown function is active. In other words, only an active state or a state of partial standby in which the clock of the microcircuit card is active may be used when the countdown function is active (when the clock of the identification card is used). If the countdown function is based on a clock of the mobile terminal, the state of partial standby is a state in which the countdown function is operational without the clock of the identification card necessarily being active.

Alternatively, it may be prohibited to change the state of the identification card when the countdown function is active. Thus, advantageously, a state variable, preferably stored in a volatile memory, for example the state variable PIN_OK, is set to a first value when the countdown function is activated (for example, PIN_OK=1). This state variable is set to a second value when the countdown function is reinitialized or when the countdown has terminated (for example PIN_OK=0). Alternatively, this state variable may be set directly to that second value when the timer function emits an interrupt (when the timer expires), the countdown function then being deactivated when the state variable is set to that second value. In this case, the interrupt generated by the timer function triggers a function, preferably a software function, for updating the state variable PIN_OK.

Next, when a command directed to a function of the executed protected application is processed by the microcontroller of the microcircuit card, a test is carried out to determine whether the received password is valid (step 335). It is noted here that a command directed to a function of the executed protected application may be linked directly to the latter (it is, in this case, received automatically) may result from a choice by the user (the command is then received via the central processing unit 120 through the intermediary of an instruction coming from the mobile terminal, as illustrated by the arrow in dashed line) or may come from the station to which the mobile terminal is connected (the command is then received via the module 130, as illustrated by the arrow in dashed line).

To determine whether a password is valid, the microcontroller of the microcircuit card here makes use of the time countdown function launched earlier. Thus, if the time has run out, the password is considered as not valid. Furthermore, according to a particular embodiment, the number of executions of the protected application (or of functions of that application) since the entering of the password may be compared with a predetermined number of uses. It is thus possible to limit the use of a password to a single command, two commands, etc.

If the password is not valid, an instruction is sent to the mobile terminal to invite the user to re-enter a password (the algorithm returns to step 315 described earlier).

If, on the contrary, the password is considered as valid, the command considered is processed and the corresponding function is executed (step 340). As already stated, the execution of this function may call upon the mobile terminal, in particular to make use of the short-range wireless communication module used. According to a particular embodiment in which a password can only be used for the execution of a single function, the time countdown function is reinitialized (to stop it). In this way, if a new protected command must be executed, the password will be considered as not valid without it being necessary to compare the number of commands executed since the reception of that password to a number of predetermined uses.

It is observed here that applications may be protected in that the execution of certain of their functions is subjected to certain constraints, in particular the authentication of the user, as described earlier. However, an application may also be protected globally, that is to say when the execution of the application has been authorized (after authentication of the user), there is no need to authenticate the user to execute its functions. Nevertheless, when this application makes use of another protected application, it may be necessary to re-authenticate the user to execute that other application.

When the microcircuit card detects a command for placing on standby, and if the level of placing on standby is such that it is liable to affect the execution of the protected application, in particular the internal countdown function, a test is carried out to determine whether the command for placing on standby can be executed or whether its execution must be deferred. For these purposes, a module for managing placing on standby is preferably implemented in the microcircuit card. It may be a hardware module or a software module. It may in particular be integrated into the operating system of the microcircuit card. If a state variable, for example the state variable PIN_OK, preferably stored in volatile memory, is used, the module for managing placing on standby determines the value of the state variable and, depending on that value, authorizes or does not authorize the placing into the requested state of standby.

Figure 4:
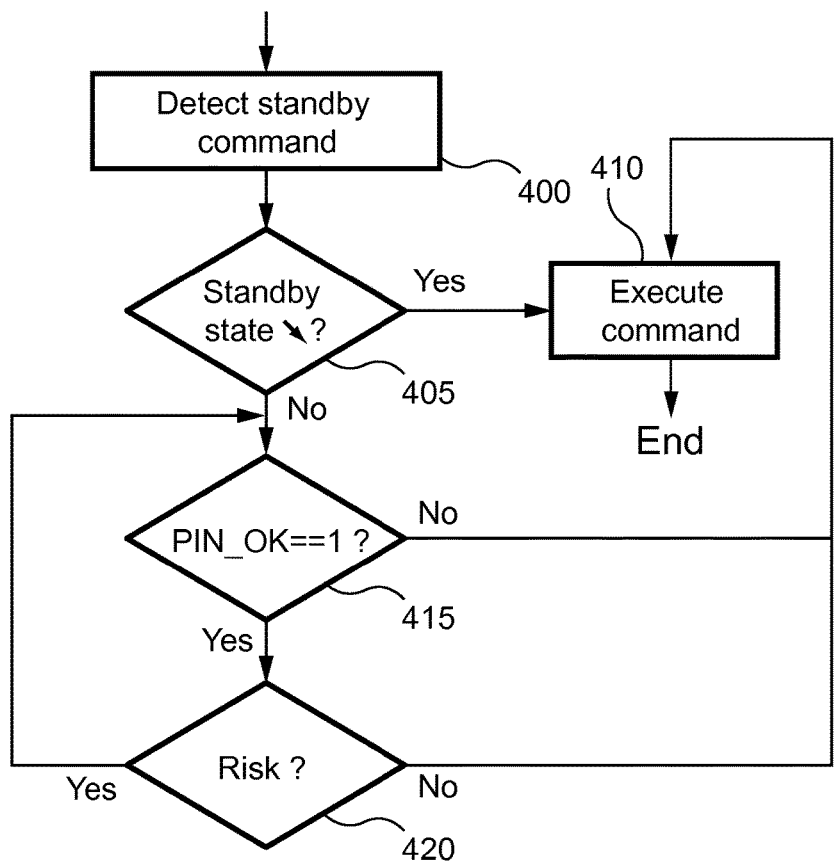

FIG. 4 illustrates certain steps of an example algorithm of a module for managing placing on standby, in accordance with the invention. As illustrated, a first step (step 400) is directed to the detection of a command for placing on standby the microcircuit card comprising that module. In accordance with the ISO 7816 standard, this command is detected on the basis of the clock signal coming from the mobile terminal in which the microcircuit card is used, when the clock signal is stopped.

In a following step, the module for managing placing on standby determines whether the requested standby state, associated with the command for placing on standby, is lower than current state of standby (step 405), that is to say whether the requested state of standby is directed to the activation of certain functions of the microcircuit card (the requested state of standby is, in that case, lower than or equal to the current state of standby) or if, on the contrary, the requested state of standby concerns the inhibition of certain functions of the microcircuit card (the requested state of standby is, in that case, higher than the current state of standby).

If the requested state of standby is lower than or equal to the current state of standby, the command received for placing on standby is executed (step 410).

On the contrary, if the requested state of standby is greater than the current state of standby, a test is carried out to determine the value of the state variable used to indicate that protected internal functions are liable to be affected by placing on standby at a higher level than the current state of standby (step 415). According to the example given earlier, this step here is directed to determining the value of the variable PIN_OK.

If the value of the state variable used indicates that protected internal functions are not liable to be affected by placing on standby at a higher level than the current state of standby, the command received for placing on standby is executed (step 410).

On the contrary, if the value of the state variable used indicates that protected internal functions are liable to be affected by placing on standby at a higher level than the current state of standby, another test is carried out to determine whether the requested level of standby affects the execution of a protected internal function (step 420), for example if the requested state of standby is directed to inhibiting the countdown function or the timer function (if they are different). In the affirmative, the last two steps (steps 415 and 420) are repeated to defer the execution of the detected command for placing on standby.

As a variant, the interrupt generated by the timer function may be used to trigger a function, preferably a software function, for updating the state variable PIN_OK, this updating function comprising a function for standby management. Thus, if a command for placing on standby has already been detected, that is to say if a standby is awaited, the microcircuit card is placed on standby when that interrupt occurs, further to the updating of the state variable PIN_OK.

On the contrary, if the requested level of standby does not affect the execution of a protected internal function, the detected command for placing on standby is executed (step 410).

The value of the state variable used may be stored in a volatile or non-volatile memory according to the levels of standby of the microcircuit cards such that this value is accessible in the highest state of standby in which a protected internal function may be executed. It is noted here that it may be possible to modify the state of standby (pass from one state of standby to a lower level) to change the value of a state variable.

According to a particular embodiment, the execution of the commands for placing on standby may be controlled by the protected internal functions which manage the state variables relative to them or by the protected applications which make use of those protected internal functions. According to this embodiment, the protected internal functions or the protected applications, after having received an indication that a command for placing on standby has been detected, indicate, to the module for managing placing on standby, the time at which the commands for placing on standby may be executed.

According to another embodiment, a protected internal function embedded in a microcircuit card relates to a function for managing the memory of the card. It may in particular be a function called "wear leveling".

It is to be recalled here that the memories used in the microcircuit cards generally comprise memories of EEPROM type (EEPROM standing for Electrically-Erasable Programmable Read-Only Memory) which typically have a limited number of writing cycles, for example 20 or 100 million writing operations. However, some memory zones are generally accessed, for writing, more often than others. Thus, to avoid premature end of life of a microcircuit card (linked to it being impossible to write to certain zones of memory), a function for moving data between zones of memory is implemented in order to distribute the writing operations as uniformly as possible. This memory management function is commonly called wear leveling.

Such an internal function may be executed in parallel to the execution of applications called by a user, which may lead to a drop in performance of the microcircuit cards. They may also be implemented when the microcircuit cards are unused. In this case, the later placing on standby of certain components of the microcircuit cards, in particular components having the task of the reading and writing operations may lead, for example, to data losses. It is thus necessary to provide a mechanism for preventing data loss on placing microcircuit cards on standby.

This problem is advantageously solved by the invention. According to a particular embodiment, a first indication is sent to the operating system of the identification card, or more generally to a module for managing placing on standby, when the wear leveling function is activated. Similarly, a second indication is sent to the operating system of the identification card, or more generally to a module for managing placing on standby, when the execution of the wear leveling function has terminated. Thus, knowing the state of the wear leveling function, the operating system, or more generally a module for managing placing on standby, may prohibit the full standby state of the microcircuit card when the wear leveling function is active. Alternatively, it may be prohibited to change the state of the microcircuit card when the wear leveling function is active. For these purposes, a state variable, for example the state variable WL_OK, is set to a first value when the wear leveling function is activated (for example WL_OK=1). This state variable is set to a second value when the execution of the wear leveling function has terminated (for example WL_OK=0).

The module for managing placing on standby is thus similar to that described with reference to FIG. 4, the state variable PIN_OK being replaced by the state variable WL_OK. Advantageously, the same state variable, for example STANDBY_OK, is used to control the execution of protected internal functions in order for commands for placing on standby to be deferred, where appropriate.

As described earlier, the algorithms described above, in particular the algorithms described with reference to FIGS. 3 and 4, are advantageously implemented in a microcircuit card, for example an identification card of a subscriber to a mobile telephone network such as a SIM card.

Naturally, to satisfy specific needs, a person skilled in the art will be able to make amendments to the preceding description.

The invention claimed is:

1. A method for execution control of at least one protected internal function embedded in a microcircuit device configured to be used in cooperation with a mobile terminal, the method for execution control being implemented in said microcircuit device, the method comprising:
   receiving an item of authentication data for the execution of an embedded protected application embedded in the microcircuit device, the item of authentication data being received from the mobile terminal, and executing the protected application when the item of authentication data is valid;
   detecting, by the microcircuit device, a command for placing said microcircuit device on standby, said command for placing on standby being detected based on an item of information received from the mobile terminal into which the microcircuit device is connected;
   analyzing, by the microcircuit device, at least one indication to determine whether or not the at least one protected internal function, related to access to the embedded protected application, being executed is liable to be affected by the command for placing on standby; and
   deferring execution, by the microcircuit device, of said command for placing on standby, based on the determination that the at least one protected internal function being executed is liable to be affected by the command for placing on standby.

2. The method according to claim 1, further comprising:
   setting a state variable to a first value on launching said at least one protected internal function; and
   setting said state variable to a second value when the execution of said at least one protected internal function has terminated or when said protected internal function is reinitialized,
   wherein said analyzing includes analyzing the value of said state variable.

3. The method according to claim 1, wherein the execution of said command for placing on standby is controlled by said at least one protected internal function.

4. The method according to claim 1, further comprising comparing a level of standby requested that is associated with said command for placing on standby with a standby state of said microcircuit device.

5. The method according to claim 1, wherein said microcircuit device or said mobile terminal is provided with short-range wireless communication means, said microcircuit device comprising an embedded protected application configured to use the short-range wireless communication means and the protected internal function,
   the method further comprising:
   receiving an item of authentication data for the execution of said protected application, said item of authentication data being received from said mobile terminal;
   comparing said received item of authentication data with at least one item of data stored in said microcircuit device;
   when said received item of authentication data corresponds to said at least one stored item of data and said protected application is invoked, verifying the validity of said received item of authentication data according to at least one criterion dynamically defined in said microcircuit device; and
   when said received item of authentication data is valid, executing said protected application.

6. The method according to claim 5, wherein said protected internal function is a countdown function,
   the method further comprising: invoking said countdown function for a predetermined time when the received item of authentication data corresponds to the at least one stored item of data,
   wherein said verifying includes verifying that said time has not run out.

7. The method according to claim 6, wherein said countdown function is based on a hardware clock of said microcircuit device.

8. The method according to claim 5, further comprising:
   receiving at least one item of information from said mobile terminal to which said microcircuit device is connected, to indicate that at least one contactless access station is accessible via said short-range wireless communication means;
   selecting at least said protected application embedded in said microcircuit device in response to said at least one received item of information and sending at least one reference to said at least one selected application to said mobile terminal; and
   receiving at least one identifier of an application, said identifier corresponding to a reference to said embedded protected application.

9. The method according to claim 1, wherein said microcircuit device is a microcircuit card.

10. A non-transitory computer-readable medium encoded with a computer program comprising instructions adapted for the carrying out of each of the steps of the method according to claim 1 when said program is executed on a computer.

11. A device comprising means for implementing the operations of the method according to claim 1.

12. A microcircuit device for execution control of at least one protected internal function embedded in said microcircuit device, said microcircuit device being configured to be used in cooperation with a mobile terminal, the microcircuit device comprising:
   a microcontroller configured to receive an item of authentication data for the execution of an embedded protected application embedded in the microcircuit device, the item of authentication data being received from the mobile terminal, and execute the protected application when the item of authentication data is valid, to detect a command for placing said microcircuit device on standby, said command for placing on standby being detected based on an item of information received from the mobile terminal into which the microcircuit device is connected, to analyze at least one indication to determine whether or not the at least one protected internal function, related to access to the embedded protected application, being executed is liable to be affected by the command for placing on standby, and to defer execution of said command for placing on standby, based on the determination that the at least one protected internal function being executed is liable to be affected by the command for placing on standby.

13. The device according to claim 12, further comprising at least one memory configured to store at least one item of data relative to said at least one protected internal function.

14. The device according to claim 13, wherein the microcontroller is additionally configured to execute a cryptography algorithm protecting said at least one item of data relative to said at least one protected internal function.

15. The device according to claim 12, wherein the microcontroller is additionally configured to execute an algorithm for hardware protection of at least one component of said device.

16. An identification card of a subscriber to a mobile telephone network comprising the device according to claim 11.

17. A mobile terminal integrating the device according to claim 11.

18. The method according to claim 2, further comprising comparing a level of standby requested that is associated with said command for placing on standby with a standby state of said microcircuit device.

19. The method according to claim 2, wherein said microcircuit device or said mobile terminal is provided with short-range wireless communication means, said microcircuit device comprising an embedded protected application configured to use the short-range wireless communication means and the protected internal function, the method further comprising:
    receiving an item of authentication data for the execution of said protected application, said item of authentication data being received from said mobile terminal;
    comparing said received item of authentication data with at least one item of data stored in said microcircuit device;
    when said received item of authentication data corresponds to said at least one stored item of data and said protected application is invoked, verifying the validity of said received item of authentication data according to at least one criterion dynamically defined in said microcircuit device; and
    when said received item of authentication data is valid, executing said protected application.

20. The method according to claim 6, further comprising:
receiving at least one item of information from said mobile terminal to which said microcircuit device is connected, to indicate that at least one contactless access station is accessible via said short-range wireless communication means;
selecting at least said protected application embedded in said microcircuit device in response to said at least one received item of information and sending at least one reference to said at least one selected application to said mobile terminal; and
receiving at least one identifier of an application, said identifier corresponding to a reference to said embedded protected application.

* * * * *